(12) United States Patent
Frait et al.

(10) Patent No.: US 10,731,741 B2
(45) Date of Patent: Aug. 4, 2020

(54) MODULAR HYBRID ELECTRIC VEHICLE ROTOR HUB

(71) Applicant: FORD GLOBAL TECHNOLOGIES, LLC, Dearborn, MI (US)

(72) Inventors: Steven A. Frait, Milan, MI (US); John E. Brevick, Livonia, MI (US); Keith A. Devereaux, Roseville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 663 days.

(21) Appl. No.: 15/404,472

(22) Filed: Jan. 12, 2017

(65) Prior Publication Data

US 2017/0122421 A1 May 4, 2017

Related U.S. Application Data

(60) Division of application No. 14/154,223, filed on Jan. 14, 2014, now Pat. No. 9,581,210, which is a continuation-in-part of application No. 13/362,018, filed on Jan. 31, 2012, now Pat. No. 9,579,965.

(51) Int. Cl.
*F16H 45/02* (2006.01)
*F16D 33/18* (2006.01)
*B60K 6/405* (2007.10)
*B60K 6/48* (2007.10)
*B21J 5/00* (2006.01)
*B21K 1/76* (2006.01)
*F16D 25/06* (2006.01)
*B60K 6/387* (2007.10)

(52) U.S. Cl.
CPC .......... *F16H 45/02* (2013.01); *B21J 5/00* (2013.01); *B21K 1/762* (2013.01); *B60K 6/405* (2013.01); *B60K 6/48* (2013.01); *F16D 25/06* (2013.01); *F16D 33/18* (2013.01); *B60K 6/387* (2013.01); *B60Y 2304/076* (2013.01); *B60Y 2400/426* (2013.01); *F16H 2045/0215* (2013.01); *F16H 2045/0221* (2013.01); *Y02T 10/6221* (2013.01); *Y10S 903/914* (2013.01); *Y10T 29/49826* (2015.01)

(58) Field of Classification Search
CPC ............ F16H 45/02; F16H 2045/0215; Y10T 29/49826
See application file for complete search history.

(56) References Cited

U.S. PATENT DOCUMENTS 3,722,076 A * 3/1973 Dent ............... B21D 39/04
29/516
3,744,605 A * 7/1973 Piret ............... F16D 13/683
192/70.2
3,922,932 A * 12/1975 Maurice ............ F16D 13/52
475/284

(Continued)

*Primary Examiner* — Jacob J Cigna
*Assistant Examiner* — Michael W Hotchkiss
(74) *Attorney, Agent, or Firm* — David B. Kelley; MacMillan, Sobankski & Todd, LLC

(57) ABSTRACT

A method for forming a rotor hub that includes a sheet metal cylinder including spline teeth including angularly spaced crests and valleys, a tube surrounding the cylinder, secured to the crests and supporting a rotor thereon, a hub secured to the cylinder and supported for rotation, a torque converter, and a flex plate secured to the hub and the torque converter.

12 Claims, 5 Drawing Sheets

(56) References Cited

U.S. PATENT DOCUMENTS

| | | | |
|---|---|---|---|
| 3,982,415 A * | 9/1976 | Killop | B21D 17/04 72/88 |
| 4,716,756 A * | 1/1988 | Fujioka | F16D 13/62 72/353.4 |
| 4,807,351 A * | 2/1989 | Berg | B21D 26/14 29/419.2 |
| 4,813,522 A * | 3/1989 | Fujioka | F16D 13/52 192/70.2 |
| 4,856,166 A * | 8/1989 | Miwa | B23P 15/14 29/893.2 |
| 4,945,782 A * | 8/1990 | Farrell | F16D 25/0638 192/70.2 |
| 5,180,043 A * | 1/1993 | Walker | F16D 13/683 192/70.19 |
| 5,304,012 A * | 4/1994 | Wendling | B21D 39/04 403/274 |
| 6,007,430 A * | 12/1999 | Prater | F16D 1/101 403/375 |
| 6,035,737 A * | 3/2000 | Prater | B23P 11/005 192/70.2 |
| 6,628,021 B2 * | 9/2003 | Shinohara | B60K 6/26 310/68 B |
| 7,021,171 B2 * | 4/2006 | Huber | B21D 22/16 72/208 |
| 7,225,908 B2 * | 6/2007 | Back | F16H 45/02 192/3.3 |
| 7,293,637 B2 * | 11/2007 | Janson | B60K 6/48 180/65.25 |
| 7,489,114 B2 * | 2/2009 | Nomura | B60K 6/26 322/33 |
| 7,679,238 B2 * | 3/2010 | Nomura | B60K 6/365 310/78 |
| 7,744,474 B2 * | 6/2010 | Valovick | F16C 3/03 464/162 |
| 7,819,774 B2 * | 10/2010 | Haupt | F16B 4/004 475/331 |
| 8,291,700 B2 * | 10/2012 | Kombowski | F16H 41/24 60/367 |
| 8,499,600 B2 * | 8/2013 | Szuba | F16D 13/646 29/522.1 |
| 8,794,097 B2 * | 8/2014 | Buechner | F16D 13/683 74/446 |
| 8,833,124 B2 * | 9/2014 | Cripsey | B21D 22/18 72/82 |
| 8,836,181 B2 * | 9/2014 | Iwase | B60K 6/40 310/67 R |
| 8,836,187 B2 * | 9/2014 | Iwase | B60K 6/26 310/78 |
| 8,852,752 B2 * | 10/2014 | Cripsey | B32B 15/04 428/579 |
| 8,863,923 B2 * | 10/2014 | Kaneko | F16H 45/02 192/110 B |
| 8,978,799 B2 * | 3/2015 | Arnold | B60K 6/26 180/65.22 |
| 9,481,234 B2 * | 11/2016 | Ideshio | B60K 6/405 |
| 9,950,605 B2 * | 4/2018 | Suyama | B60K 6/387 |
| 10,167,907 B2 * | 1/2019 | Satoyoshi | F16D 25/0638 |
| 2001/0020563 A1 * | 9/2001 | Sasse | F16H 45/02 192/3.28 |
| 2003/0173175 A1 * | 9/2003 | Tomiyama | F16H 45/02 192/3.29 |
| 2004/0045752 A1 * | 3/2004 | Omote | B60K 6/26 180/65.26 |
| 2006/0113157 A1 * | 6/2006 | Ichikawa | F16D 25/123 192/113.34 |
| 2011/0239818 A1 * | 10/2011 | Kasuya | B60K 6/387 74/665 A |
| 2013/0008759 A1 * | 1/2013 | Kasuya | B60K 1/00 192/110 B |

* cited by examiner

MODULAR HYBRID ELECTRIC VEHICLE ROTOR HUB

CROSS REFERENCE TO RELATED APPLICATIONS

This is a divisional application of pending U.S. application Ser. No. 14/154,223, filed Jan. 14, 2014, which is a continuation-in-part application of U.S. application Ser. No. 13/362,018, filed Jan. 31, 2012.

BACKGROUND OF INVENTION

This invention relates to a powertrain of hybrid electric vehicles, particularly to a powertrain module that can be installed between and secured to an engine output and a transmission input.

Hybrid electric vehicles (HEVs) have both an internal combustion engine and an electric machine, which are alternately, or in combination, used to propel the vehicle. A variety of different powertrains are used in hybrid vehicles such as a parallel configuration, in which the engine is connected to the motor by a disconnect clutch with the motor driving a torque converter input of an automatic power transmission. The transmission has an output which is connected to a differential coupled to the two driven wheels of the vehicle.

A need exists in the industry for a hybrid electric powertrain that includes a modular subassembly for use with a variety of engines and transmissions, such that the module can be installed between and secured to an output of one of a number of engines and to an input of one of a number of transmissions. The assembled powertrain may then be employed in a variety of vehicles. The module should include a hydraulically actuated disconnect clutch, the electric machine and suitable power paths between the engine and electric machine to the transmission input. Preferably, the module provides for hydraulic communication from the transmission's hydraulic system to the clutch, a balance dam and the electric machine. The module must provide an oil sump containing hydraulic fluid delivered to the module, and a path for continually returning that fluid to the transmission's oil sump so that the transmission pump is continually supplied reliably with fluid.

Most disconnect clutches are dry, but wet clutches are generally more controllable and allow oil cooling of the clutch and motor. Nesting the disconnect clutch inside the motor rotor allows improves packaging but generally requires an expensive rotor hub since it must hold the rotor, clutch piston and clutch plates.

The module should require low manufacturing and assembly costs, no vehicle body modification, and must provide reliable performance.

SUMMARY OF INVENTION

A rotor hub includes a sheet metal cylinder including spline teeth including angularly spaced crests and valleys, a tube surrounding the cylinder, secured to the crests and supporting a rotor thereon, a hub secured to the cylinder and supported for rotation, a torque converter, and a flex plate secured to the hub and the torque converter.

A method for forming a rotor hub includes forming a sheet metal cylinder having spline teeth defining angularly spaced crests and valleys, securing a tube surrounding the cylinder to the crests, securing a rotor on the tube, forming a hub secured to the cylinder, and supporting the hub for rotation about an axis.

The rotor hub is comprises three simple, low-cost components a cylinder, a cylindrical tube, and a hub. Torque is transmitted between the hub and the torque converter through the flex plate.

Centrifugal force causes automatic transmission fluid (ATF) to flow radially continually outward through the cylinder, tube and rotor, thereby carrying heat from clutch plates, cylinder and tube away from the module. ATF that exits the assembly falls due to gravity to a sump at the bottom of the module, passes through a cooler and returns to the transmission sump, from which it is drawn by suction into the transmission pump for recirculation through the hydraulic system.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

The invention will be more readily understood by reference to the following description, taken with the accompanying drawings, in which.

DETAILED DESCRIPTION

Figure 1A:
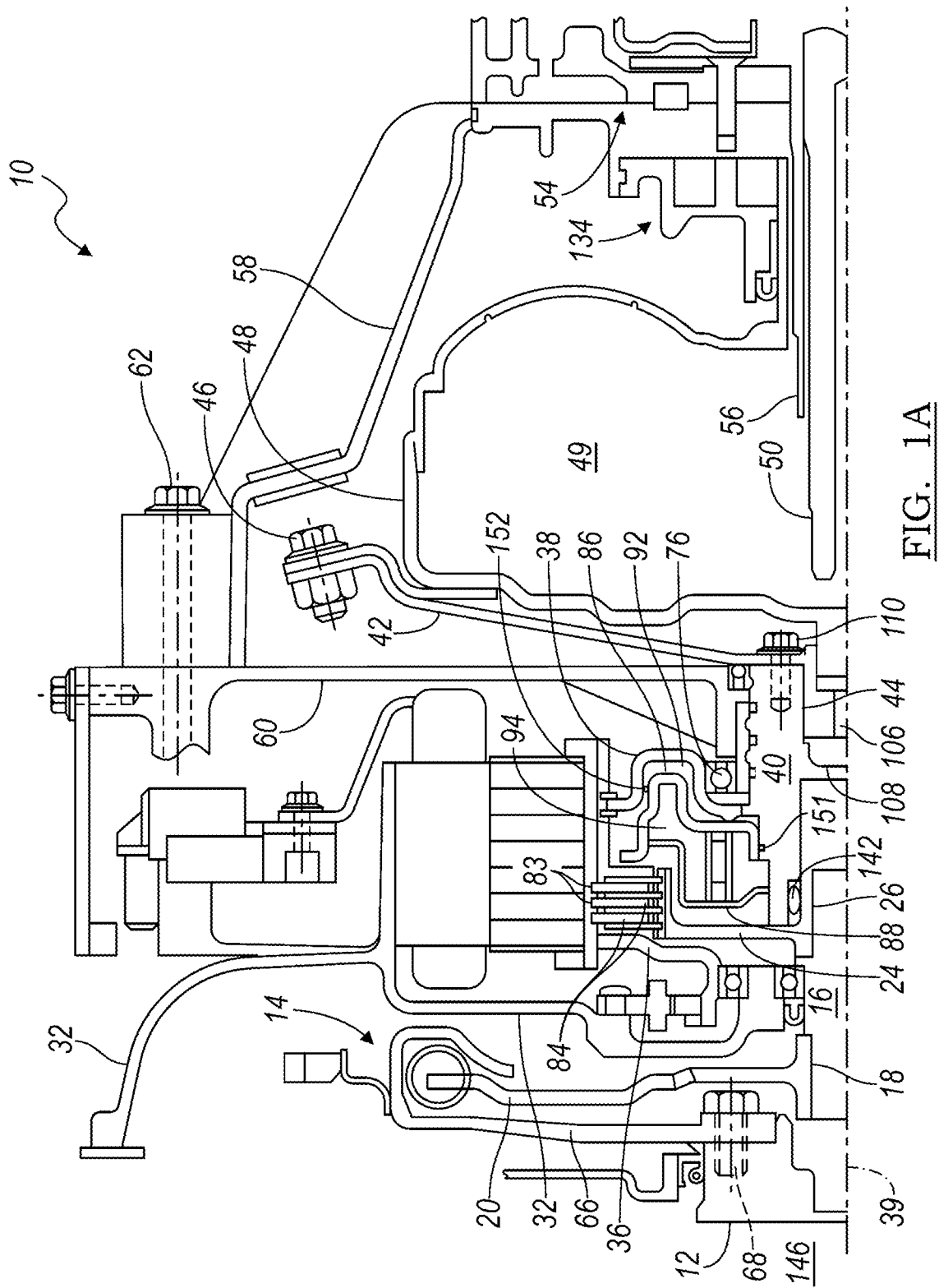
FIGS. 1A and 1B comprise a side cross-sectional view of a powertrain module showing a front connection to an engine output and a rear connection to a transmission torque converter input.
Figure 1B:
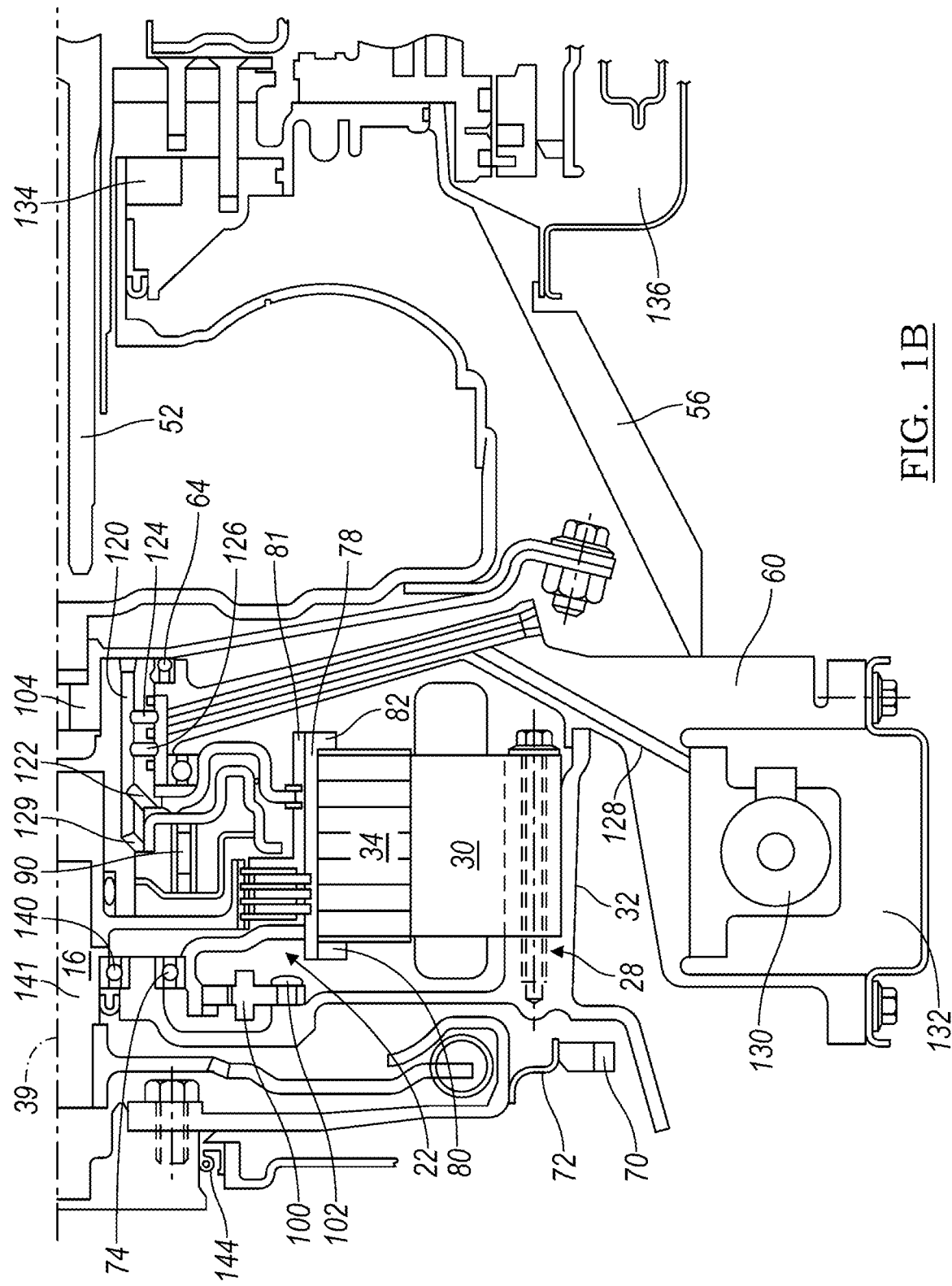

FIGS. 1A and 1B illustrate a module 10 of a powertrain for a hybrid electric vehicle that includes an engine having a rotary output 12; a torsional damper 14, secured to the engine output 12; an input shaft 16, secured by a spline 18 to an output 20 of damper 14; a disconnect clutch 22, supported on a clutch hub 24 that is secured by a spline 26 to input shaft 16; an electric machine 28, which includes a stator 30 bolted to a front bulkhead 32 and a rotor 34 supported by a first leg 36 and a second leg 38 for rotation about an axis 39; a rotor hub 40, secured preferably by a weld to leg 38; and a flexplate 42, secured at one end by a spline connection 44 to rotor hub 40 and secured at the opposite end by bolts 46 to a torque converter casing 48, which encloses a hydrokinetic torque converter 49. The electric machine 28 may be an electric motor or an electric motor-generator.

Torque converters suitable for use in the powertrain are disclosed in and described with reference to FIGS. 4a, 4b, 5, 12 and 15 of U.S. patent application Ser. No. 13/325,101, filed Dec. 14, 2011, the entire disclosure of which is herein incorporated by reference.

The torque converter 49 includes a bladed impeller wheel located within and secured to casing 48; a bladed turbine, driven hydrokinetically by the impeller and secured by a spline 50 to the input shaft 52 of an automatic transmission 54; and a bladed stator wheel, located between the turbine and stator and secured to a stator shaft 56, which is held against rotation on a transmission housing 58.

A rear bulkhead 60, secured by bolts 62 to the transmission housing 58, is fitted at its radial inner surface with a hydraulic seal 64, which contacts the radial outer surface of rotor hub 40.

A flywheel 66, secured by bolts 68 to the engine's rotary output 12, carries an engine starting gear 70, which is secured by a disc 72, welded to the starting gear and flywheel.

A bearing 74 supports the first leg 36 for rotation on the front bulkhead 32. A bearing 76 supports the second leg 38 for rotation on the rotor hub 40. A tube 78, aligned with axis 39 and supporting the rotor 34 for rotation about the axis, is secured to the first leg 36 and second leg 38. Lips 80, 82 at the front and rear ends, respectively, of tube 78 may be rolled radially outward to secure the rotor 34 to tube 78 and to prevent axial displacement of the rotor 34 relative to the tube. The inner surface of tube 78 is formed with an axial spline 81, which is engaged by the legs 36, 38 and alternate plates 83 of the disconnect clutch 22. The friction plates 84 of clutch 22 are secured by an axial spline formed on the radial outer surface of clutch hub 24.

A hydraulic servo for actuating clutch 22 includes a piston 86, balance dam 88, return spring 90 and hydraulic lines for transmitting actuating pressure to the pressure control volume 92 at the right hand side of piston 86 and to the pressure balance volume 94 at the left hand side of the piston. Piston 86 moves leftward in a cylinder formed by the rear leg 38 when actuating pressure and hydraulic fluid is supplied to volume 92, by the use of seals 151 and 152, thereby causing clutch 22 to engage and driveably connect rotor 34 and the engine output 12 through damper 14, input shaft 16, clutch hub 24 and clutch 22.

Because the piston 86, balance dam 88 and return spring 90 are supported on the rotor hub 40, rotational inertia of the piston 86, balance dam 88 and return spring 90 is located on the output side, i.e., the rotor side of clutch 22.

Rotor 34 is continually driveably connected to the transmission input shaft 52 through the torque path that includes rear leg 38, rotor hub 40, flexplate 42, torque converter casing 48, the hydrodynamic drive connection between the torque converter impeller and turbine, which is connected by spline 50 to transmission input shaft 52.

A resolver 100, a highly accurate type of rotary electrical transformer used for measuring degrees of rotation, is secured by bolts 102 to the front bulkhead 32, is supported on the front bulkhead 32 and first leg, and is located axially between the front bulkhead 32 and rear bulkhead 60.

The teeth of spline 44, which produces a rotary drive connection between flexplate 42 and rotor hub 40, are fitted together such that no lash is produced when torque is transmitted between the flexplate and rotor hub. Flexplate 42 is formed with a thick walled portion 104 having a threaded hole 106 that terminate at a web 108. The external spline teeth on flexplate 42 are forced axially into engagement with the internal spline teeth on rotor hub 40 by bolts 110, which engage threaded holes in the right-hand end of rotor hub 40. The engaged spline teeth at the spline connection 44 are disengaged upon removing bolts 110 and threading a larger bolt into hole 106 such that the bolt contacts web, thereby forcing flexplate axial rightward.

Rotor hub 40 is formed with multiple axially-directed hydraulic passages 120 and laterally-directed passages 122, 124, 126, 128, 129, which carry hydraulic fluid and pressure to module 10 from the hydraulic system of the transmission 54. Passages 120, 122, 124, 126, 128, 129 carry hydraulic fluid and pressure which includes to the control volume 92 of the servo of clutch 22 located at the right hand side of piston 86, to the pressure balance volume 94 between balance dam 88 and the piston, to a variable force solenoid (VFS) 130, and to the surfaces of rotor 34 and stator 30, which surfaces are cooled by the fluid. The rear bulkhead 60 is formed with passage 128, which communicates hydraulically with VFS 130.

The rear bulkhead 60 supports a sump 132, which contains fluid supplied to module 10 from the hydraulic system of the transmission 54. Transmission 54 includes a sump 136, which contains hydraulic fluid that is supplied by a transmission pump 134 to the transmission hydraulic system, from which fluid and control pressure is supplied to module 10, torque converter 49, transmission clutches and brakes, bearings, shafts, gears, etc.

A bearing 140, fitted in the front bulkhead 32, and a bearing 142, fitted in the rotor hub 40, support input shaft 16 in rotation about axis 39. The front bulkhead 32 also supports the stator 30 in its proper axial and radial positions relative to the rotor 34. Bearing 76, fitted between rear bulkhead 60 and rotor hub 40, and bearing 142 support rotor hub 40 in rotation about axis 39. The front and rear bulkheads 32, 60 together support rotor 34 in rotation about axis 39 due to bearing 74, fitted in bulkhead 32, and bearing 76, fitted in bulkhead 60.

Seal 64, fitted in the rear bulkhead 60, and seal 141, fitted in the front bulkhead 32, prevent passage of fluid from module 10 located between the bulkheads 32, 60. Another dynamic seal 144 prevents passage of contaminants between the engine compartment 146 and module 10.

The components of module 10 are installed and assembled in the module. The assembled module can then be installed between and connected to the engine output 12 and the torque converter casing 48.

In operation, when the engine output 12 is driven by an engine, torque is transmitted from the engine through rotor hub 40 and flexplate 42 to the torque converter casing 48, provided that clutch 22 is engaged. The rotor 34 electric machine 28 is continually driveably connected through tube 78, leg 38, rotor hub 40 and flexplate 42 to the torque converter casing 48. Therefore, the torque converter casing 48 can be driven by the engine alone, provided the electric machine 28 is off and clutch 22 is engaged; by the electric machine alone, provided the engine is off or the engine in operating and the clutch is disengaged; and by both the engine and electric machine concurrently.

Figure 2:
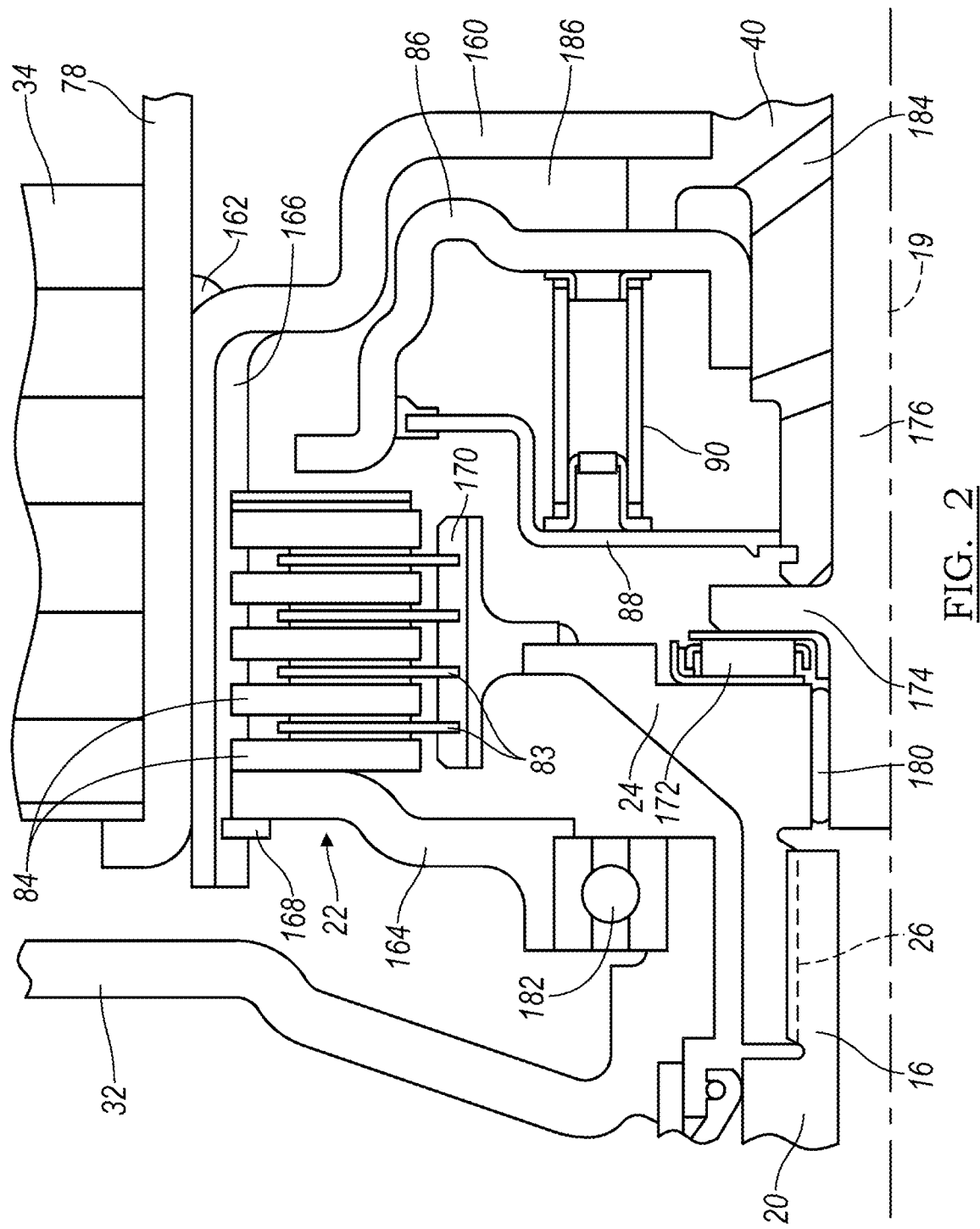
FIG. 2 is a side cross-sectional view of a portion of the powertrain module showing a component functioning as a clutch reaction plate and a forward support of the electric machine's rotor.
Figure 3:
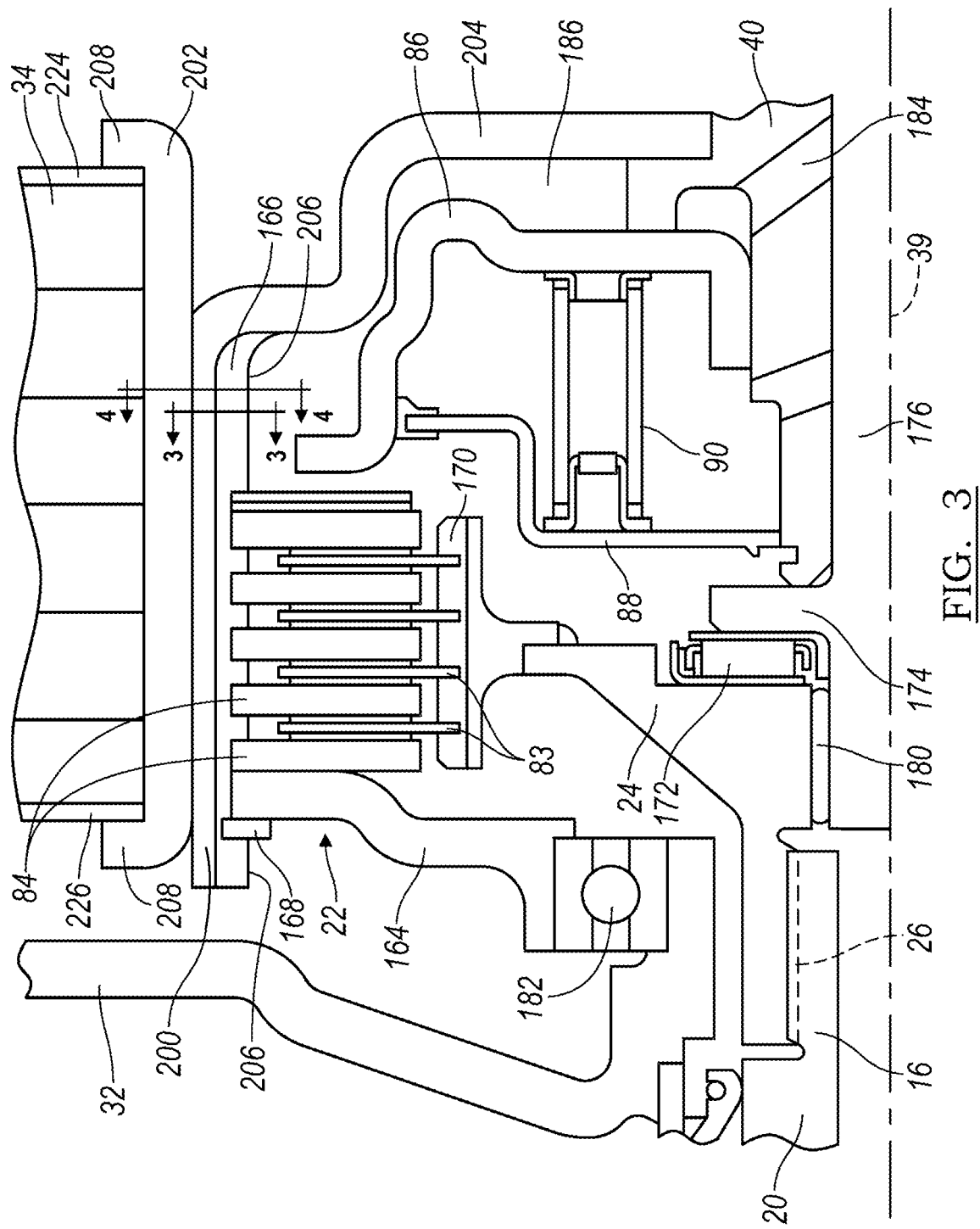
FIG. 3 is a side cross-sectional view of a rotor hub formed from stamped components.

Referring to FIG. 2, the rotor 34 of electric machine 28 is supported on tube 78, which is supported by a shell 160, connected by a weld 162 to tube 78 and by welding to rotor hub 40, and by a leg 164, secured through an axial, inner spline 166 to shell 160. A single snap ring 168, secured to the shell 160 and contacting leg 164, limits axial displacement of the friction plates 84, which are secured by spline 166 to shell 160. Spacer plates 83 are secured by an external axial spline 170 on clutch hub 24.

A thrust bearing 172 contacts clutch hub 24 and a flange 174 on a shaft 176 that is parallel to axis 19. A bearing supports clutch hub on shaft 176. The engine output 12 is connected through flywheel 66, damper 20, input shaft 16 and spline 26 to clutch hub 24.

A bearing 182, fitted between front bulkhead 32 and leg 164, supports the rotor 34 for rotation about axis 19 and provides a reaction to axial force transmitted between leg 164 and bulkhead 32.

In operation, piston 86 moves leftward against the force of return spring 90 when pressurized hydraulic fluid is supplied through passage 184 to the cylinder 186 that contains piston 86. Disconnect clutch 22 is engaged when friction plates 83 and spacer plates 84 are forced by piston 86 into mutual frictional contact, thereby producing a drive connection between rotor hub 40 and the engine output 12. Rotor 34 is continually driveably connected to rotor hub 40 through shell 160.

The leftward axial force applied by piston 86 is transmitted through plates 83, 84 through 164, snap ring 168, and shell 160.

FIGS. 3-6 illustrate a rotor hub formed from stamped components comprising a clutch cylinder 200, a tube 202 and a hub 204. Cylinder 200 includes a bore 204, which contains clutch piston 86, preferably, formed by a stamping process, and axial splines 166, which engage clutch separator plates 84, the cylinder 200 and splines 166 being formed by any of several methods including hammer forging.

Rotor 34 of electric machine 28 is supported on tube 202, which has rolled ends 208 for retaining the rotor on the tube. Tube 202 can be of seamless tubing or of tubing having a continuous welded seam. Cylinder 200 is preferably secured to tube 202 by a press fit.

Hub 40 is preferably secured to cylinder 200 by welding. Hub 40 transmits torque from the electric machine 28 and from the engine through the clutch 22 to the torque converter 49 by flex plate 42.

Figure 4:
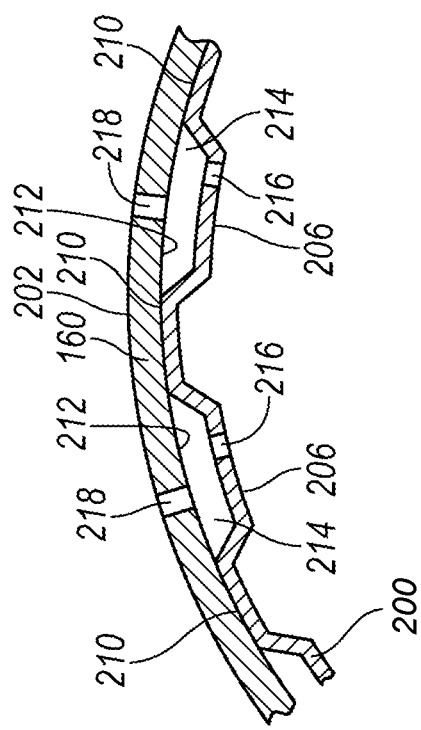
FIG. 4 is a cross section taken at plane 4-4 of FIG. 3.

FIG. 4 shows that the axial spline 166 of cylinder 200, comprises a series of mutually, angularly-spaced valleys at the bore 206 and crests 210. Each crest 210 is secured to the radial inner surface 212 of tube 202.

Angularly-spaced, axially-directed first channels 214 are defined by surface 212 and the splines 166 of cylinder 200. The surfaces of cylinder 200 that forms the valleys is formed with a radial hole 216, which communicates with the channel 214 that is located radially outboard of the respective valley. Cylinder 202 is formed with a series of axially-spaced drain holes 218, each communicating with one of the channels 214.

Figure 5:
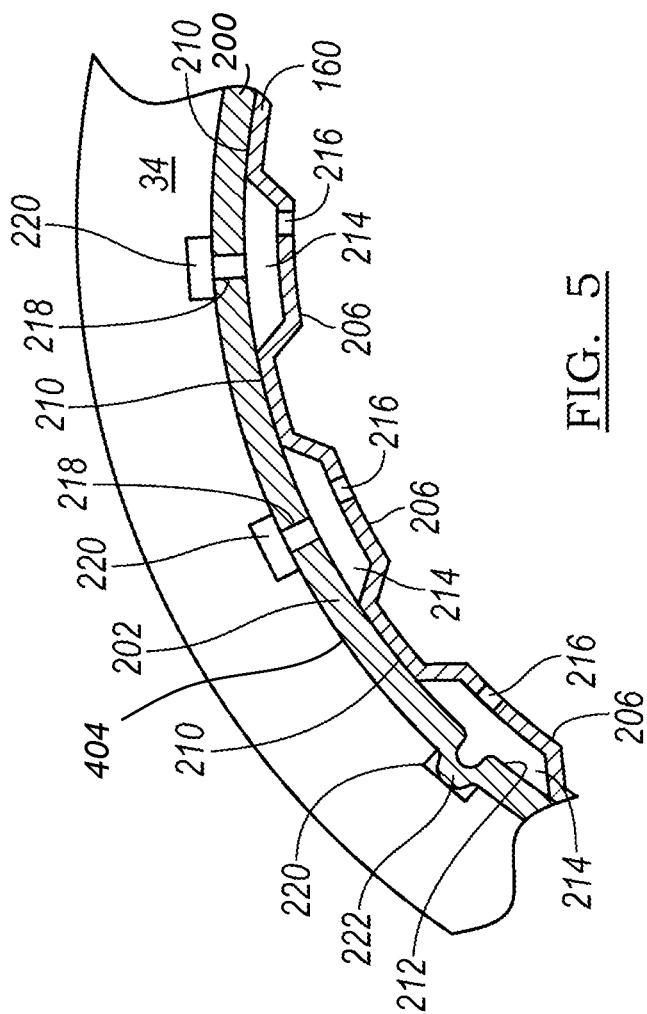
FIG. 5 is a cross section taken at plane 5-5 of FIG. 3.

FIG. 5 shows that rotor 34 is formed with a series of axially-directed second channels 220, each communicating through a drain hole 218 with one of the channels 214 of the cylinder 200. Some of the channels 214 receive an axially-directed protrusion 222 that extends radially into the channel, thereby connecting tube 202, cylinder 200, and rotor 34 such that they rotate as a unit about axis 39 keeping rotor 34 from spinning on the outer surface 404 of the tube 202.

Figure 6:
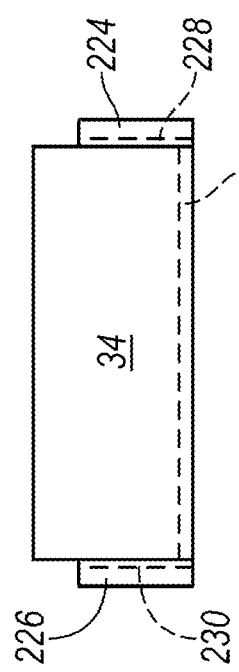
FIG. 6 is a side view of the rotor and end plates.

FIG. 6 shows that each axial second channel 220 terminates at one of the end plates 224, 226, located at opposite axial ends of rotor 34. Each end plate 224, 226 is formed with a series of radially-directed passages 228, 230, each passage aligned with one of the axial second channels 220.

In operation, centrifugal force causes automatic transmission fluid (ATF) in module 10 to flow radially outward through holes 216, channels 214 holes 218, channels 220 and passages 228, 230, thereby carrying heat from clutch plates 83, 84, cylinder 200, tube 202 and rotor 34 away from the module 10. As the fluid exits channels 228 and 230, the oil sprays radially outward due to centrifugal force, contacting the endwindings of stator 30, thereby cooling the stator. ATF that exits the assembly falls due to gravity to a sump at the bottom of module 10, passes through a cooler and returns to the transmission sump, from which it is drawn by suction into the transmission pump for recirculation through the hydraulic system.

In accordance with the provisions of the patent statutes, the preferred embodiment has been described. However, it should be noted that the alternate embodiments can be practiced otherwise than as specifically illustrated and described.

The invention claimed is:

1. A method for forming a rotor hub, comprising:
    forming a sheet metal cylinder having spline teeth defining angularly spaced crests and valleys;
    securing a tube surrounding the cylinder to only the crests of the cylinder;
    securing a rotor on the tube; and
    forming a hub secured to the cylinder and supported for rotation thereon.

2. The method of claim 1 further comprising securing the tube to the crests by one of welding and press fitting.

3. The method of claim 1 further comprising forming the cylinder by hammer forging.

4. The method of claim 1 further comprising using a flex plate to driveably connect the hub to a torque converter.

5. The method of claim 1 further comprising securing a flex plate to the hub and to a torque converter.

6. The method of claim 1, further comprising:
    locating a clutch piston in the cylinder; and
    engaging clutch plates with the spline teeth and actuating the clutch plates with the piston.

7. The method of claim 1, wherein the tube and spline teeth define first channels, and further comprising:
    forming holes in the cylinder, each hole extending through one of the valleys and communicating with one of the first channels; and
    forming the tube with drain holes, each drain hole communicating with one of the first channels.

8. The method of claim 7, wherein the rotor includes second channels, each second channel communicating through one of the drain holes with one of the first channels.

9. The method of claim 8, further including orienting the first channels and the second channels along an axis of rotation.

10. The method of claim 8, further providing end plates, each end plate being located at an opposite end of the rotor and formed with radial passages, each passage communicating with one of the second channels.

11. The method of claim 10, further comprising orienting the passages radially with respect to an axis of rotation.

12. A method for forming a rotor hub, comprising:
    forming a sheet metal cylinder having spline teeth defining angularly spaced crests and valleys;
    securing a sheet metal tube surrounding the cylinder to the crests;
    securing a rotor on the tube;
    forming a hub secured to the cylinder and supported for rotation thereon;
    locating a clutch piston in the cylinder; and
    engaging clutch plates with the spline teeth.

* * * * *